United States Patent
Han

(10) Patent No.: US 8,947,545 B2
(45) Date of Patent: Feb. 3, 2015

(54) CAMERA MODULE

(75) Inventor: Jinsuk Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 210 days.

(21) Appl. No.: 13/486,059

(22) Filed: Jun. 1, 2012

(65) Prior Publication Data

US 2012/0307088 A1   Dec. 6, 2012

(30) Foreign Application Priority Data

Jun. 3, 2011   (KR) .................. 10-2011-0054130

(51) Int. Cl.
*H04N 5/228* (2006.01)
*H01L 31/0203* (2014.01)
*G02B 7/02* (2006.01)
*G03B 17/02* (2006.01)
*G03B 13/34* (2006.01)
*H04N 5/225* (2006.01)
*H04N 5/232* (2006.01)

(52) U.S. Cl.
CPC ......... *H04N 5/2254* (2013.01); *H04N 5/23287* (2013.01)
USPC .................. 348/208.11; 348/208.7; 348/373; 348/374; 257/433; 359/824; 396/55; 396/133; 396/529; 396/535

(58) Field of Classification Search
None
See application file for complete search history.

(56) References Cited

U.S. PATENT DOCUMENTS

| | | | |
|---|---|---|---|
| 7,033,185 B2* | 4/2006 | Kuo et al. ........................ | 439/67 |
| 7,589,920 B2* | 9/2009 | Shin et al. ..................... | 359/811 |
| 7,881,598 B1* | 2/2011 | Wu et al. .......................... | 396/55 |
| 2008/0254652 A1* | 10/2008 | Ma ................... | 439/67 |
| 2010/0098394 A1* | 4/2010 | Ishihara et al. .................. | 396/55 |
| 2010/0123960 A1* | 5/2010 | Liao .............................. | 359/824 |
| 2011/0096178 A1* | 4/2011 | Ryu et al. .................. | 348/208.2 |
| 2011/0122267 A1* | 5/2011 | Ahn et al. .................. | 348/208.7 |

* cited by examiner

*Primary Examiner* — Timothy J Henn
*Assistant Examiner* — Quan Pham
(74) *Attorney, Agent, or Firm* — Saliwanchik, Lloyd & Eisenschenk

(57) ABSTRACT

The present disclosure relates to a camera module including: an auto focusing module upping and downing a lens; a hand-shaking correction module wrapping the auto focusing module to correct a hand-shaking by horizontally tilting the auto focusing module; a circuit substrate electrically connected to the hand-shaking correction module and the auto focusing module; a bottom case supporting the circuit substrate to be coupled to the auto focusing module; and a main circuit substrate secured to the bottom case to be electrically connected to the image sensor module, wherein the main circuit substrate is formed with oblong symmetrical openings along an edge of the main circuit substrate.

17 Claims, 4 Drawing Sheets

CAMERA MODULE

CROSS-REFERENCE TO RELATED APPLICATION

This application claims the benefit under 35 U.S.C. §119 of Korean Patent Application No. 10-2011-0054130, filed Jun. 3, 2011, which is hereby incorporated by reference in its entirety.

BACKGROUND

1. Field of the Invention

The teachings in accordance with the exemplary embodiments of this present disclosure generally relate to a camera module applicable to a smart phone.

2. Background

Recently, a mobile phone, a smart phone and a smart pad which is a type of portable personal computer, mounted with a camera module capable of storing an object in a digital image or a moving image, have been developed.

A conventional camera module includes a lens and an image sensor module converting light having passed the lens to a digital image. However, the conventional camera module has a difficulty in obtaining a high quality digital image due to lack of auto-focusing function capable of automatically adjusting a gap between the lens and the image sensor module and hand-shaking correction function in mobile phones, smart phones and smart pads.

BRIEF SUMMARY

The present disclosure has been made to solve the foregoing problems of the prior art and therefore an object of certain embodiments of the present disclosure is to provide a camera module configured to greatly improve auto focusing and shaking correction function, and ease of assembly, and to inhibit hand-shaking correction function from being decreased by main circuit substrate applied with a driving signal.

Technical subjects to be solved by the present disclosure are not restricted to the above-mentioned description, and any other technical problems not mentioned so far will be clearly appreciated from the following description by the skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

Therefore, an object of the present disclosure is to solve at least one or more of the above problems and/or disadvantages in whole or in part and to provide at least advantages described hereinafter. In order to achieve at least the above objects, in whole or in part, and in accordance with the purposes of the invention, as embodied and broadly described, and in one general aspect of the present invention, there is provided a camera module, the camera module comprising: an auto focusing module upping and downing a lens; a hand-shaking correction module wrapping the auto focusing module to correct a hand-shaking by horizontally tilting the auto focusing module; a circuit substrate electrically connected to the hand-shaking correction module and the auto focusing module; a bottom case supporting the circuit substrate to be coupled to the auto focusing module; and a main circuit substrate secured to the bottom case to be electrically connected to the image sensor module, wherein the main circuit substrate is formed with oblong symmetrical openings along an edge of the main circuit substrate.

Preferably, the main circuit substrate includes a body unit formed with the openings, and a connection unit protruded from the body unit to be electrically connected to the circuit substrate.

Preferably, each of the openings is formed in the shape of a slit along at least three sides of the main circuit substrate, and the image sensor module is arranged at an upper surface of the main circuit substrate.

Preferably, a pair of openings is symmetrically formed based on the image sensor module.

Preferably, the image sensor module is arranged at a center of the main circuit substrate formed by the pair of opening.

Preferably, both distal ends of the main circuit substrate are coupled to the bottom case.

Preferably, the camera module further comprises a holder securing the image sensor module.

Preferably, the holder is arranged with an IR (Infrared) filter.

Preferably, the auto focusing module includes an auto focusing housing mounted with the auto focusing module, a bobbin arranged inside the auto focusing housing and mounted with the lens, and a coil wound on the bobbin.

Preferably, a magnet is arranged at an inner lateral surface of the auto focusing housing opposite to the coil.

Preferably, the hand-shaking correction module includes a housing wrapping the auto focusing module, coil blocks each arranged at a lateral wall of the housing, and a magnet formed opposite to the coil block and arranged at an external lateral surface of the auto focusing module.

Preferably, the coil block is arranged inside an accommodation groove formed at each lateral wall of the housing, and both distal ends of each coil block are electrically connected to the circuit substrate.

Preferably, the both distal ends of each coil block and the circuit substrate are soldered at an external side of the housing.

Preferably, the camera module further comprises: an external elastic unit formed in a mutually insulated pair and coupled to the hand-shaking correction module, an inner elastic unit coupled to the auto focusing module and a connection elastic unit connecting the inner and external elastic units.

Preferably, a terminal formed at the external elastic unit is electrically connected to the circuit substrate, and the inner elastic unit is electrically connected to the auto focusing module.

Preferably, the circuit substrate is formed in the shape of a frame along a bottom surface of the housing of the hand-shaking correction module.

Preferably, the circuit substrate includes a first terminal electrically connected to the hand-shaking correction module, and a second terminal connected to the auto focusing module.

Preferably, a part of the circuit substrate is protruded to an external lateral surface of the housing, and the protruded part is formed with connection terminals connected to the main circuit substrate.

Preferably, the circuit substrate includes a flexible circuit substrate.

Preferably, the camera module further comprises a cover can to accommodate the auto focusing module, the hand-shaking correction module, the circuit substrate and the main circuit substrate.

The camera module according to the present disclosure has an advantageous effect in that a lens is upped and downed by an auto focusing module, an auto focusing module is tilted by a hand-shaking correction module to perform hand-shaking correction, and an opening symmetrical to a main circuit substrate coupled to the auto focusing module is formed to inhibit a tilt operation fault of the auto focusing module.

BRIEF DESCRIPTION OF THE DRAWINGS

The accompanying drawings, which are included to provide further understanding of the disclosure and are incorporated in and constitute a part of this application, illustrate embodiment(s) of the disclosure and together with the description serve to explain the principle of the disclosure. In the drawings.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Descriptions of well-known components and processing techniques are omitted so as not to unnecessarily obscure the embodiments of the disclosure.

Hereinafter, a camera module will be described in detail with reference to the accompanying drawings.

Figure 1:
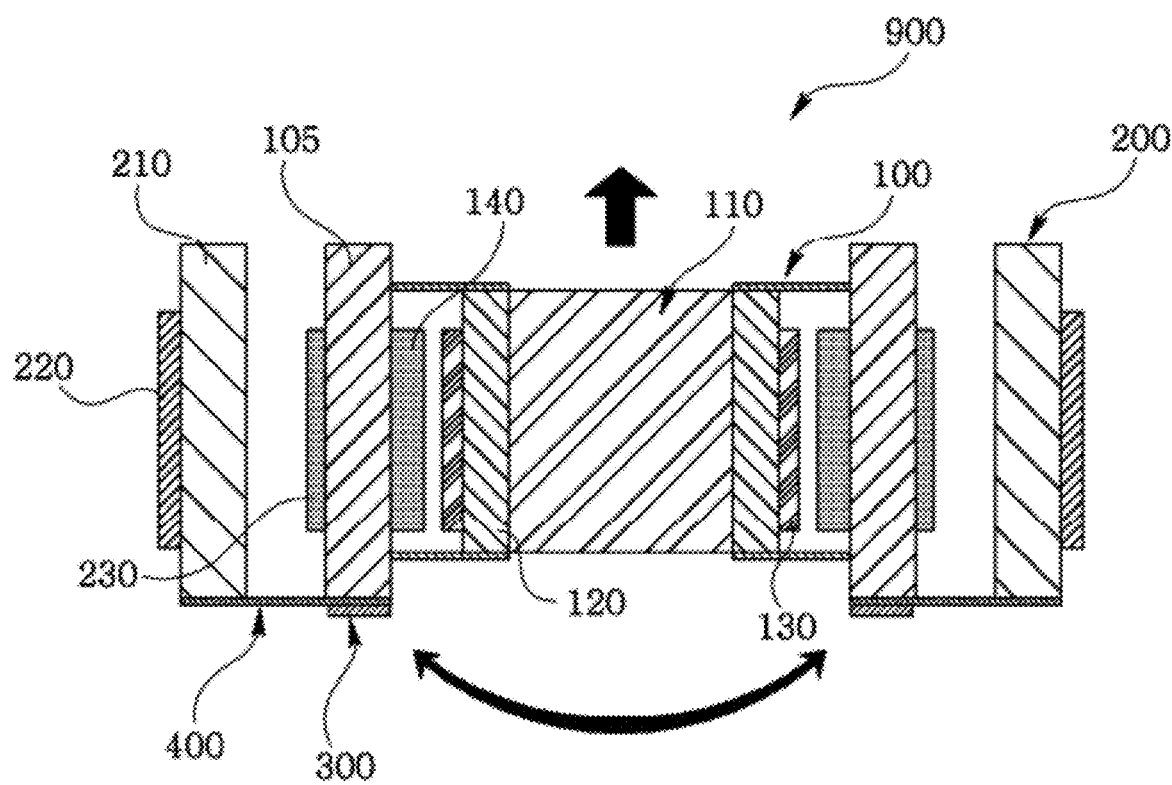
FIG. 1 is a cross-sectional view illustrating an auto focusing module and a hand-shaking correction module of a camera module according to an exemplary embodiment of the present disclosure.
Figure 2:
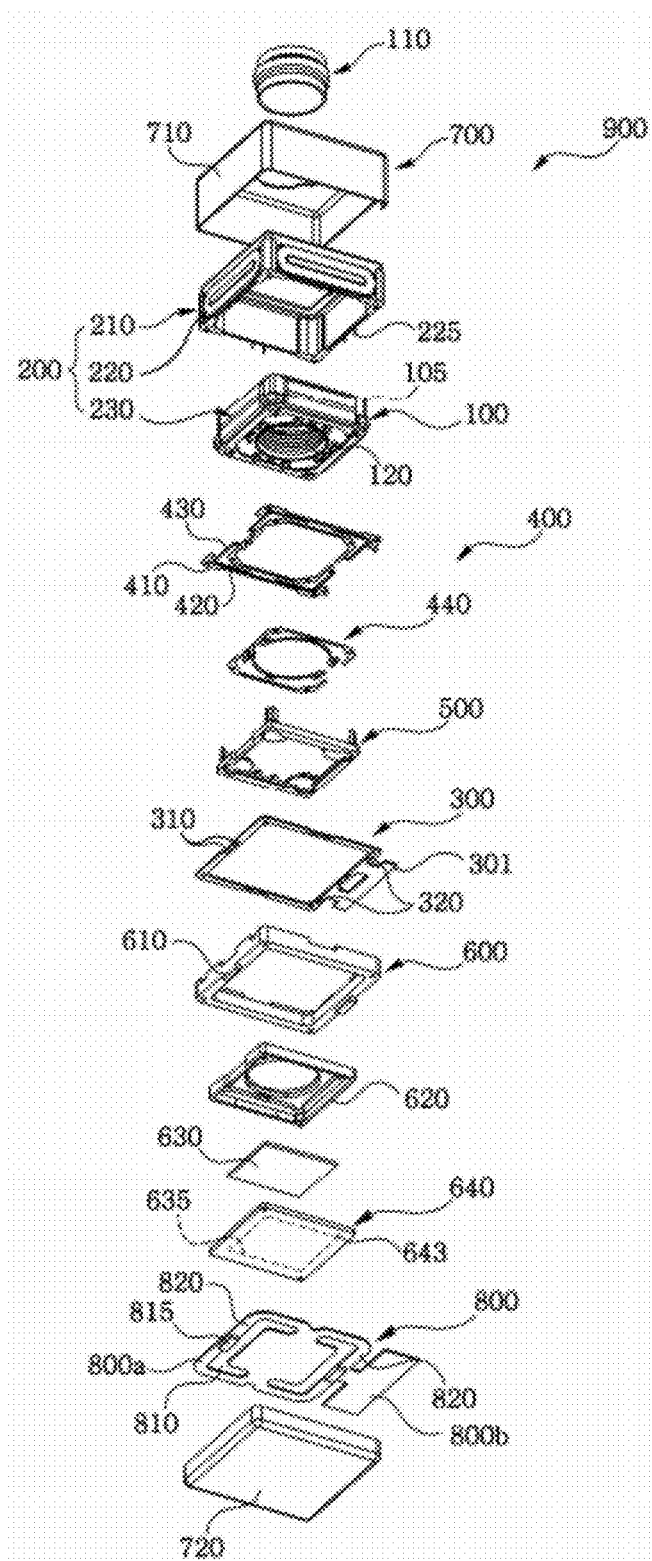
FIG. 2 is an exploded perspective view illustrating a camera module according to an exemplary embodiment of the present disclosure.
Figure 3:
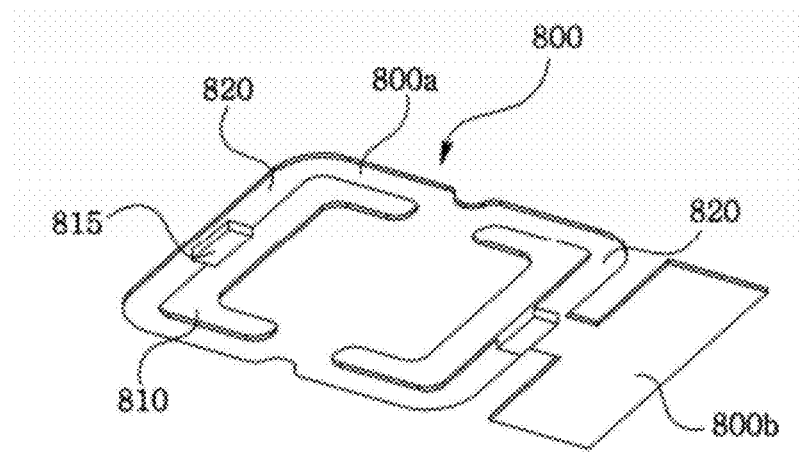
FIG. 3 is a perspective view illustrating a main circuit substrate of FIG. 2.
Figure 4:
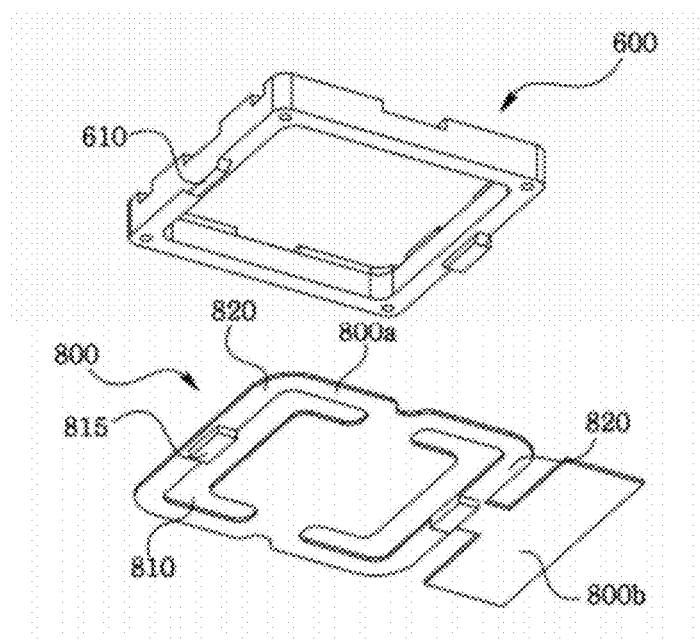
FIG. 4 is a rear surface perspective view illustrating a bottom case and a main circuit substrate of FIG. 2.
Figure 5:
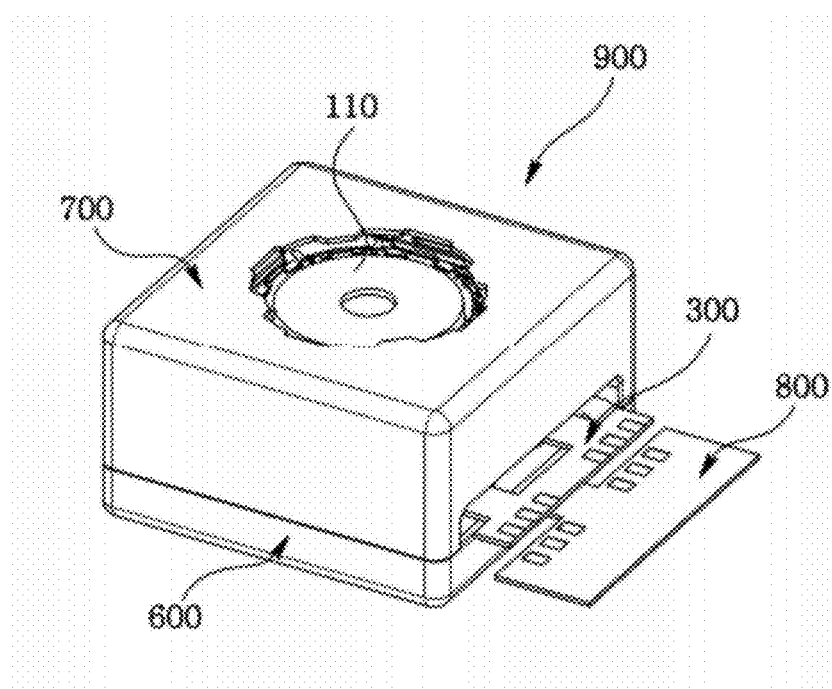
FIG. 5 is an assembled perspective view of FIG. 1.

FIG. 1 is a cross-sectional view illustrating an auto focusing module and a hand-shaking correction module of a camera module according to an exemplary embodiment of the present disclosure, FIG. 2 is an exploded perspective view illustrating a camera module according to an exemplary embodiment of the present disclosure, FIG. 3 is a perspective view illustrating a main circuit substrate of FIG. 2, FIG. 4 is a rear surface perspective view illustrating a bottom case and a main circuit substrate of FIG. 2, and FIG. 5 is an assembled perspective view of FIG. 1.

Referring to FIGS. 1 to 5, a camera module (900) includes an auto focusing module (100), a hand-shaking correction module (200), a circuit substrate (300), an elastic member (400), a base (500), a bottom case (600), a cover can (700) and a main circuit substrate (800).

Referring to FIG. 1, the auto focusing module (100) may include an auto focusing housing (105), a lens (110), a bobbin (120), an auto focusing coil (130) and an auto focusing magnet (140).

The auto focusing module (100) may take a shape of upper/bottom ends-opened box, for example. The bobbin (120) is arranged inside the auto focusing housing (105), the bobbin (120) may take a shape of a cylinder, for example. An inner surface of the bobbin (120) may be mounted with the lens (110).

The auto focusing coil (130) may be wound on a periphery of the bobbin (120), and may be formed by winding an insulated resin-coated long wire on the periphery of the bobbin (120). A magnetic field is generated from the auto focusing coil (130) by applying a current to the auto focusing coil (130), where direction of the magnetic field is determined by direction of the current. The auto focusing magnet (140) is mounted at an inside of the auto focusing housing (105), and is arranged opposite to the auto focusing coil (130).

The auto focusing module (100) is such that the bobbin (120) is upped and downed from the auto focusing housing (105) by attracting force or repulsive force generated by a magnetic field by the current applied to the auto focusing coil (130) and a magnetic field generated by the auto focusing magnet (140).

Referring to FIG. 2, the hand shaking correction module (200) is coupled to the auto focusing module (100) to correct hand shaking of the auto focusing module (100), whereby a higher quality image can be obtained. The hand shaking correction module (200) includes a housing (210), a coil block (220) and a magnet (230).

The housing (210) is formed by four lateral walls, and is arranged at an external side of the auto focusing housing (105) to wrap the auto focusing module (100).

The coil block (220) is arranged inside an accommodation groove formed at an external lateral wall of each lateral wall. Each coil block (220) is formed by winding an insulated resin-coated long wire in an oblong shape, such that the coil block (220) is formed with two distal ends.

The coil block (220) can be easily assembled on the circuit substrate (300, described later) by arranging the coil block (220) to the external lateral surfaces of four lateral walls of the housing (210) in the exemplary embodiment of the present disclosure.

In a case the coil block (220) is arranged at an inner lateral surface of each lateral wall of the housing (210) of very small size, assembly fault can be frequently developed due to difficulty in assemblage of the coil block (220) and the circuit substrate.

The magnet (230) is arranged at an external lateral surface of the auto focusing module (100), and magnetic field generated by the magnet (300) interacts with magnetic field generated from the coil block (220) formed at the external lateral surface of each lateral wall of the housing (210) to inhibit or restrict shaking of the auto focusing module (100) caused by hand-shaking.

In the exemplary embodiment of the present disclosure, the coil block (220) of the hand-shaking correction module (200) is inputted with a driving signal corresponding to a sensing signal inputted from a gyro sensor, for example.

Referring to FIG. 1, the circuit substrate (300) is formed in the shape of a square frame when viewed in a top plan view, to improve assemblability of the coil block (220) and the circuit substrate (300) and to reduce assembly fault, and the circuit substrate (300) is formed along a bottom surface of the housing (210) of the hand-shaking correction module (200), for example, whereby circuit substrate (300) covers a bottom surface of the housing (210).

The circuit substrate (300) may be a flexible printed circuit board (FPCB) formed with a circuit wiring and terminals in the exemplary embodiment of the present disclosure, for example. A part of the circuit substrate (300) may be protruded to outside of the housing (210) of the hand shaking correction module (200) to be electrically connected to the main circuit substrate (800). The circuit substrate (300) is formed with first terminals (310), second terminals (320) and a connection wiring (not shown).

The first terminals (310) are positioned at a place corresponding to both distal ends of each coil block (220) thus described. The second terminals (320) is formed at a place connected to terminals of a leaf spring (400) each connected to both distal ends of the auto focusing coil (140) of the auto focusing module (100). In the exemplary embodiment of the present disclosure, if four coil blocks (220) are formed, eight first terminals (310) are formed on the circuit substrate (300), and two second terminals (320) are formed at the circuit substrate (300).

Furthermore, a part (301) protruded to outside of the housing (210) of the hand shaking correction module (200) in the circuit substrate (300) is formed with four connection terminals connected to the first terminals (310) and the two connection terminals connected to the second terminals (320). Foreign objects generated in the course of soldering process can be inhibited to enhance a product performance, because the part (301) protruded to the outside of the housing (210) is arranged to outside.

Both distal ends of each coil block (220) of the hand shaking correction module (200) in the exemplary embodiment of the present disclosure are connected to the first terminal (310), where in order to inhibit assembly fault and to improve assembly characteristic, each terminal (225) of the coil block (220) and the first terminal (310) are electrically connected from outside by soldering method.

The elastic member (400) serves to elastically support the tilting auto focusing module (100) and to electrically connect the auto focusing coil (140) of the auto focusing module (100) and the circuit substrate (300). The elastic member (400) in the exemplary embodiment of the present disclosure is formed in a mutually insulated pair, and each elastic member (400) is interposed between a bottom surface of the housing (210) of the hand shaking correction module (200) and the circuit substrate (300). Each elastic member (400) includes an external elastic unit (410), an inner elastic unit (420) and a connection elastic unit (430).

The external elastic unit (410) is formed along a bottom surface of the housing (210) of the hand shaking correction module (200) and is coupled by being inserted to a lug formed at the bottom surface of the housing (210). The external elastic unit (410) is formed with a terminal unit coupled to the second terminal (320) of the circuit substrate (300).

The terminal unit formed at the external elastic unit (410) in the exemplary embodiment of the present disclosure is electrically connected to the second terminal (320) of the circuit substrate (300) by soldering method. The terminal unit formed at the external elastic unit (410) and the second terminal (320) of the circuit substrate (300) is assembled at the outside to thereby inhibit connection fault and to improve assemblability.

The inner elastic unit (420) is coupled to a bottom surface of the auto focusing housing (105) of the auto focusing module (100) to elastically support the auto focusing housing (105) when the auto focusing module (100) corrects the hand shaking.

The connection elastic unit (430) serves to connect the external elastic unit (410) and the inner elastic unit (420), and the auto focusing module (100) is elastically supported to the hand shaking correction module (200) by the connection elastic unit (430).

The external elastic unit (410) of the elastic member (400) is electrically connected to the second terminal (320) of the circuit substrate (300), whereby a driving signal provided through the second terminal (320) is provided to the auto focusing coil (140) of the auto focusing module (100) sequentially through the external elastic unit (410), the connection elastic unit (430) and the inner elastic unit (420).

The elastic member (400) may further include a leaf spring (440) for auto focusing module, and the leaf spring (440) elastically supports a bottom surface of the bobbin (120) of the auto focusing module (100). Two leaf springs (440) are mechanically and electrically connected to the elastic member (400), and both distal ends of the auto focusing coil (140) wound on the bobbin (120) are electrically connected to the leaf spring.

The base (500) takes a shape of a frame having an opening, and is coupled to a bottom surface of the auto focusing housing (105) of the auto focusing module (100), where the inner elastic unit (420) of the elastic member (400) is secured to a bottom surface of the auto focusing housing (105) and the base (500) by the base (500).

The bottom case (600) takes a square frame having an opening and is coupled to the auto focusing module. A bottom surface of the bottom case (600) is formed with coupling units (610) for securing the main circuit substrate (800, described later). A pair of coupling units (610) is formed at both sides opposite to the bottom case (600). The coupling units (610) inhibit generation of interference when the auto focusing module (100) is tilted.

Meanwhile, a rear surface of the base (500) is arranged with a holder (620) formed with an opening in order to generate a digital image using light having passed the lens (110), and the holder (620) is arranged at an inner side with an IR (Infrared) filter (630). A rear surface of the IR filter (630) is formed with an image sensor module (640) including an image sensor circuit substrate (648) coupled with an image sensor (635) generating a digital image.

The main circuit substrate (800) takes a shape of a square plate and may include a body unit (800a) and a connection unit (800b) protruded from the body unit (800a). The connection unit (800b) is electrically connected to a circuit substrate (320), and may enhance a product performance by inhibiting or blocking generation and inflow of foreign objects generated in the course of soldering due to non-performance of soldering process inside the housing (210) and due to protrusion outside of the housing (210).

An upper surface of the body unit (800a) of the main circuit substrate (800) is arranged with the image sensor module (640), and electrically connected to the image sensor circuit substrate (648) of the image sensor module (640) and the circuit substrate (300) to apply a driving signal to the image sensor module (640), the auto focusing module (100) and the hand shaking correction module (200). The main circuit substrate (800) may include a flexible printed circuit board, for example.

The body unit (800a) of the main circuit substrate (800) is formed with hook units (815), and each of the hook units (815) takes a symmetrical shape based on a center of the bottom case (600). The hook units (815) inhibit generation of interference when the auto focusing module (100) is tilted.

The main circuit substrate (800), being tilted along with the auto focusing module (100), needs a part generating elasticity, and the main circuit substrate (800) in the exemplary embodiment of the present disclosure is formed with an oblong or slit-type opening (810) to generate intrinsic elasticity. The main circuit substrate (800) is formed with a spring unit (820) by the opening (810).

The oblong or slit-type opening (810) formed at the main circuit substrate (800) may be formed in the shape of "U" along three lateral sides of the square plate-shaped main circuit substrate (800). Two symmetrically formed openings (810) are formed at the main circuit substrate (800) based on a center of the main circuit substrate (800), such that, by symmetrically forming the openings (810), the tilt failure can be solved in which tilting is not accurately performed by the main circuit substrate (800) when the main circuit substrate (800) is tilted along with the auto focusing module (100).

Meanwhile, the cover can (700) includes an upper cover can (710) and a bottom cover can (720), where the upper and bottom cover cans (710, 720) have an accommodation space to accommodate the aforementioned constituent elements.

The previous description of the present disclosure is provided to enable any person skilled in the art to make or use the inventive concept. Various modifications to the disclosure will be readily apparent to those skilled in the art, and the generic principles defined herein may be applied to other variations without departing from the spirit or scope of the disclosure. Thus, the present disclosure is not intended to limit the examples described herein, but is to be accorded the widest scope consistent with the principles and novel features disclosed herein.

The camera module according to the present invention has an industrial applicability in that a lens is upped and downed by an auto focusing module, an auto focusing module is tilted by a hand-shaking correction module to perform hand-shaking correction, and an opening symmetrical to a main circuit substrate coupled to the auto focusing module is formed to inhibit a tilt operation fault of the auto focusing module.

What is claimed is:

1. A camera module, the camera module comprising:
    an auto focusing module;
    a hand-shaking correction module arranged outside of the auto focusing module to correct a hand-shaking of the auto focusing module;
    an elastic member supporting the auto focusing module;
    a first circuit substrate electrically connecting the hand-shaking correction module and the auto focusing module;
    an image sensor module arranged at a lower portion of the auto focusing module, and having a second circuit substrate mounted with the image sensor module;
    a third circuit substrate arranged at a lower portion of the image sensor module to connect the first circuit substrate to the second circuit substrate for transmission of a driving signal;
    a case arranged on top of the third circuit substrate; and
    a spring portion including a pair of U shape openings formed on the third circuit substrate to elastically support the image sensor module and the case, wherein both ends of each of the U shape openings face each other and are spaced apart by a predetermined interval that forms a square surface in between the U shape openings for elastically supporting the image sensor module and electrically connecting to the image sensor module.

2. The camera module of claim 1, wherein the third circuit substrate includes a body unit formed with the openings, and a connection unit protruded from the body unit that is electrically connected to the first circuit substrate.

3. The camera module of claim 1, wherein the two openings of the pair of openings are symmetrically formed.

4. The camera module of claim 1, further comprising a holder configured to secure the image sensor module.

5. The camera module of claim 4, wherein the holder is arranged with an IR (Infrared) filter.

6. The camera module of claim 1, wherein the auto focusing module includes an auto focusing housing mounted with the auto focusing module, a bobbin arranged inside the auto focusing housing and mounted with the lens, and a coil wound on the bobbin.

7. The camera module of claim 6, wherein a magnet is arranged at an inner lateral surface of the auto focusing housing opposite to the coil.

8. The camera module of claim 1, wherein the hand-shaking correction module includes a housing wrapping the auto focusing module, a coil block arranged at a lateral wall of the housing, and a magnet formed opposite to the coil block and arranged at an external lateral surface of the auto focusing module.

9. The camera module of claim 8, wherein the coil block is arranged inside an accommodation groove formed at each lateral wall of the housing, and both distal ends of the coil block are electrically connected to the first circuit substrate.

10. The camera module of claim 9, wherein the both distal ends of the coil block and the first circuit substrate are soldered at an external side of the housing.

11. The camera module of claim 9, wherein the elastic member comprises:
    an external elastic unit formed in a mutually insulated pair and coupled to the hand-shaking correction module;
    an inner elastic unit coupled to the auto focusing module; and
    a connection elastic unit connecting the inner and external elastic units.

12. The camera module of claim 11, wherein a terminal formed at the external elastic unit is electrically connected to the first circuit substrate, and the inner elastic unit is electrically connected to the auto focusing module.

13. The camera module of claim 1, wherein the first circuit substrate is formed in a shape of frame along a bottom surface of the housing of the hand-shaking correction module.

14. The camera module of claim 13, wherein the first circuit substrate includes a first terminal electrically connected to the hand-shaking correction module, and a second terminal connected to the auto focusing module.

15. The camera module of claim 13, wherein a part of the first circuit substrate is protruded to an external lateral surface of the housing, and the protruded part is formed with connection terminals connected to the third circuit substrate.

16. The camera module of claim 13, wherein the first circuit substrate includes a flexible circuit substrate.

17. The camera module of claim 1, further comprising a cover can accommodating the auto focusing module, the hand-shaking correction module, the first circuit substrate, and the third circuit substrate.

* * * * *